Feb. 10, 1942.  B. WEINKAUFF  2,272,986
GYROSCOPIC APPARATUS
Filed June 7, 1939  3 Sheets-Sheet 1

Inventor
B. Weinkauff
by
Herbert H. Thompson
Attorney

Feb. 10, 1942.  B. WEINKAUFF  2,272,986

GYROSCOPIC APPARATUS

Filed June 7, 1939  3 Sheets-Sheet 3

Inventor
B. Weinkauff
by Herbert H. Thompson
Attorney

Patented Feb. 10, 1942

2,272,986

UNITED STATES PATENT OFFICE 2,272,986

GYROSCOPIC APPARATUS

Bruno Weinkauff, Berlin, Germany

Application June 7, 1939, Serial No. 277,863
In Germany June 7, 1938

4 Claims. (Cl. 74—5)

This invention relates to gyroscopic apparatus and particularly to gyroscopic apparatus for use on board aircraft.

Gyroscopes are already known which have pneumatically operated rotors constructed so as to include an air turbine device driven by compressed air or by suction. Also electrically-operated gyroscopes are already known, the rotor of the gyroscope being connected to the rotated part of a direct current or alternating current motor or even being constructed as a part of such motor.

A pneumatically operated gyroscope is entirely dependent for its operation upon a requisite supply of compressed air or the production of the necessary depression in pressure to effect the suction operation of the rotor, and, on the other hand, an electrically operated gyroscope is entirely dependent for its operation upon the necessary supply of electrical energy and thus the pneumatically operated and electrically operated gyroscopes respectively fail immediately the pneumatic force or electric energy ceases to be available for any reason whatsoever.

The fallibility of these gyroscope instruments in this way has, in the past, been a very serious difficulty and has resulted in accidents to aircraft on which these instruments are most generally used, and it is an object of this invention to provide an improved gyroscopic apparatus the fallibility of which is very considerably reduced as compared with the hitherto known instruments of this nature.

A further object of the invention is to provide in a gyroscopic apparatus and in combination both electrical and pneumatic means for driving the rotor of the gyroscope.

An electrically actuated direct or alternating current gyroscope forms the rotor of an air turbine adapted to be driven by a current of air directed upon the rotor of the turbine by means of a nozzle. The air current may be produced by compressing air or by suction.

Very considerable advantages are afforded in practice by this invention due to the possibility of being able to drive the gyroscope either electrically or pneumatically. For example, should the electrical system on an aircraft on which the apparatus is employed fail, the gyroscopic apparatus can be driven by the pneumatic means which are immediately available, while, on the other hand, if the pneumatic means for driving the rotor of the gyroscopic apparatus is being employed, and if this source of energy should fail for any reason, the electrical drive can be brought into immediate action.

Means may be provided so that immediately one source of energy fails the other source of energy is brought into play so that any stoppage of the action of the gyroscopic apparatus is only a momentary one, but alternatively, or as well, the two forms of drive may be capable of independent operation.

A further advantage of apparatus according to this invention is that it is possible for it to be used as a replacement both for electrical and for pneumatic gyroscopes, and thus the storage of spares and replacements is greatly simplified.

A further and important advantage arising from the invention is that in addition to providing gyroscopic apparatus with a smaller fallibility than hitherto, at the same time this apparatus is provided without any material increase in the weight of the apparatus as compared with known apparatus, and moreover the new apparatus is not materially more expensive than the old apparatus.

It is obvious that where a gyroscopic apparatus is used in blind flying instruments such as the course gyroscope, the artificial horizon and in particular the turn indicator, the safety of the pilot is very greatly enhanced if, in the event of the electrical or pneumatic drive for the gyroscopic apparatus failing there is available an alternative drive for the gyroscopic apparatus.

In order that the invention may be clearly understood, reference will now be made to the accompanying drawings in which certain embodiments of the invention are illustrated by way of example only, and it should be fully understood that the invention is not limited in its application to the particular examples given in the drawings for illustrative purposes only.

Figure 1:
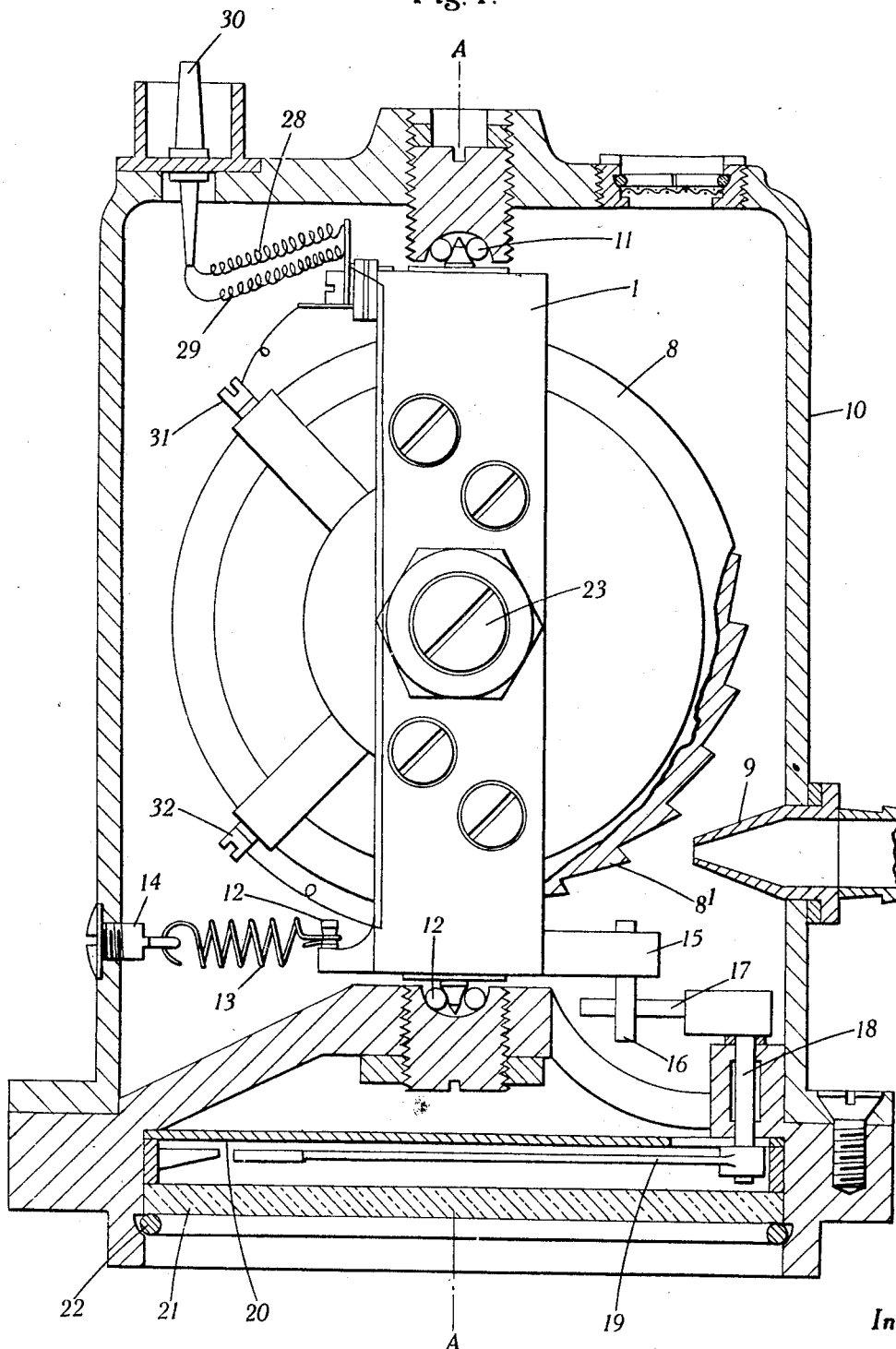
Fig. 1 is a vertical part-sectional elevation of a gyroscope constructed in accordance with this invention.
Figure 2:
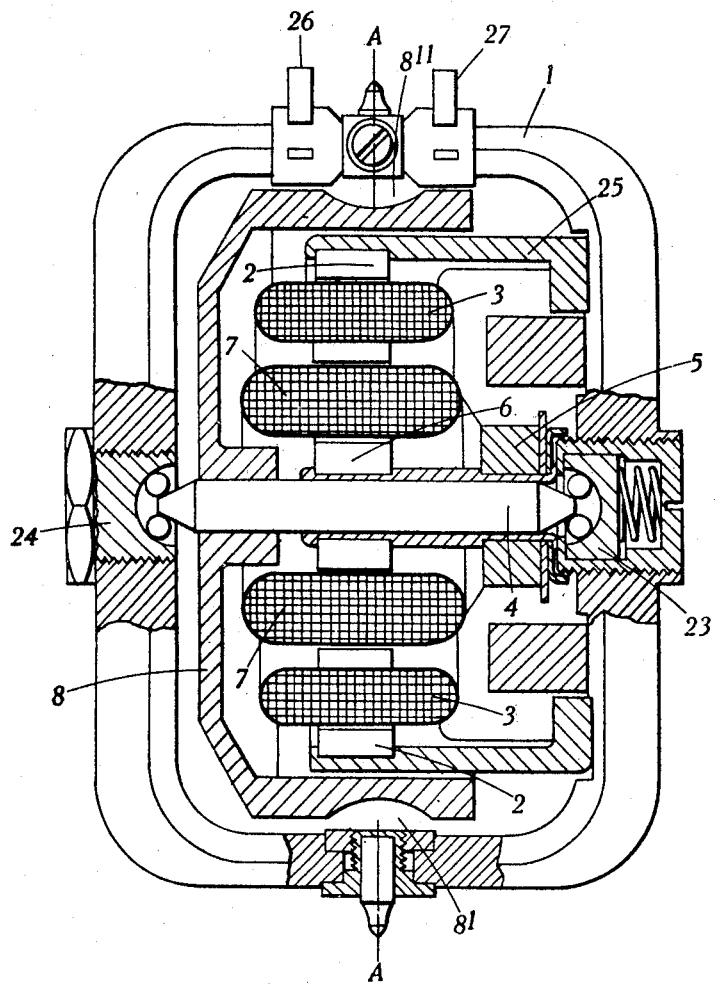
Fig. 2 is an elevational view, taken at right angles to that of Fig. 1, of the gyroscope with the casing removed.

Referring to Figures 1 and 2 of the drawings, it will be seen that the gyroscopic turn indicator there illustrated comprises an outer casing 10 within which is disposed the supporting frame 1 for the gyroscope. The frame 1 is mounted in bearings 11, 12 at the ends of the casing 10 so as to be capable of rotation about the axis A—A. The frame 1 carries a pin 12 to which is attached one end of the spring 13 having its other end connected to an anchorage member 14 carried by the wall of the casing 10. The spring 13 serves to centralise the frame 1 in the casing and tends to return it to its zero position.

The frame 1 also carries a projection 15 having a pin 16 engaging a lever 17 carried by a spindle 18 rotatably mounted in the casing 10 and disposed parallel to the axis A—A. The spindle 18 carries at its outer end a pointer hand 19 adapted to move over a dial 20 secured to the casing 10 behind a glass window 21 retained in the position by a spring ring 22.

The frame 1 is provided with bearings 23 and 24 of an adjustable nature in which is mounted the conical ends of the gyroscope spindle 4, this spindle being positioned so that its axis is perpendicular to and intersects the axis A—A.

The stator 2 of a direct current electric motor is attached to the frame 1 by brackets 25 (Fig. 2), this stator carrying field coils 3. A motor armature 6 carrying the armature coils 7 is, together with a commutator 5, mounted on the gyroscope spindle 4. This spindle also carries the gyroscope rotor 8 which is hollow or bell-shaped and its flange projects over the stator 2 of the motor as is clearly shown in Figure 2.

The necessary electric energy is conveyed to terminals 26 and 27 (Figure 2) carried by the frame 1 by suitable wires 28 and 29 from connectors 30 carried by the casing 10. Connections are also made from the terminals 26 and 27 to the screw terminals 31 and 32.

The periphery of the rotor 8 is provided with an annular row or ring of recesses 8', 8" providing turbine paddles or blades upon which a jet of air may be directed.

The jet of air is directed on to these paddles or blades by means of a nozzle 9 mounted in the casing 10 as clearly shown in Figure 1.

Figure 3:
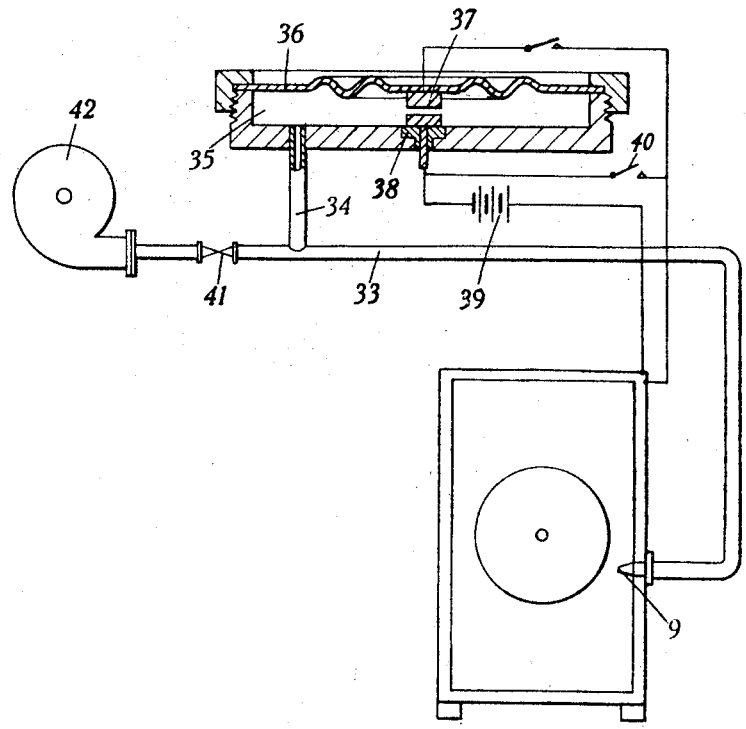
Fig. 3 is a diagrammatic illustration of a means for use with the gyroscope of Figs. 1 and 2 for bringing the electric motor into operation on failure of the pneumatic pressure.

Figure 3 shows diametrically an arrangement for automatically bringing the electric drive of the gyroscope above described into operation in the event of the failure of the pneumatic operating system of the gyroscopic apparatus.

A conduit 33 leads the air stream to the nozzle 9 which directs it on to the rotor of the turbine. The conduit 33 has a branch pipe 34 which communicates with an air-tight chamber 35 having a diaphragm 36.

The diaphragm 36 has an electric contact 37 adapted to cooperate with a further contact 38 carried by the bottom of the chamber 35. The two contacts 37 and 38 are connected in circuit to the gyroscope and a power source indicated in the present instance in a conventional manner as a battery 39.

Normally, when the air pressure in the conduit 33 is that normally required for driving the gyroscope rotor the diaphragm 36 will be in the position shown in the drawing in which the contacts 37 and 38 forming part of an electric switch will be separated, but as soon as the pressure falls below that required for driving the gyroscope rotor the diaphragm 36 will move towards the contact 38 so that the contact 37 engages with the latter and the electric circuit will be complete and the electric motor of the gyroscope previously not in operation will immediately begin to function, so that there will be no, or only a momentary, cessation of the complete functioning of the gyroscopic apparatus.

The electric circuit of the motor of the gyroscope may include a switch 40 whereby the electric motor is controllable independently of the diaphragm 36 and similarly a suitable valve 41 may be included in the conduit 33 to interrupt the flow of air to the rotor of the air turbine of the gyroscopic apparatus when desired.

In the drawings the air pressure is shown as being supplied by a centrifugal air pump 42 which is preferably driven mechanically from a moving part of the craft in which it is disposed.

Figure 4:
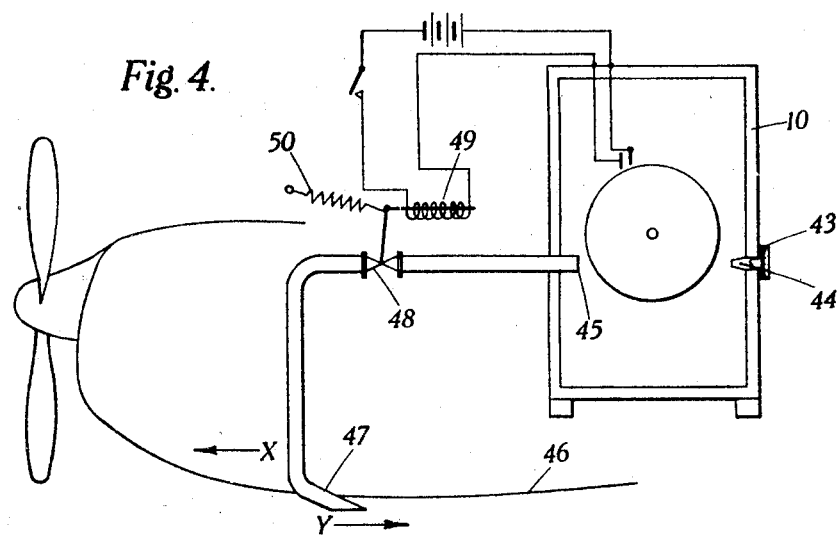
Fig. 4 is a diagrammatic illustration of a modification in which the pneumatic rotor driving means is brought into operation on failure of the electric motor.

Figure 4 illustrates diagrammatically a modification of the gyroscopic apparatus in which the air turbine is driven by suction. In this case the nozzle 9 is replaced by a further nozzle 44 which preferably has an air filter 43. Substantially opposite the nozzle 44 and at the opposite side of the casing 10 is an outlet pipe 45 through which air is withdrawn from the casing 10. This pipe may go to an air pump but may, where the gyroscopic instrument is mounted in a swiftly moving vehicle such as an aeroplane, pass out of the body 46 of this vehicle and terminate in a nozzle 47 so that as the aircraft moves in the direction of the arrow X air will be drawn from the nozzle 47 in the direction of the arrow Y. A somewhat similar arrangement could be employed for providing an air current under pressure to drive the rotor instead of the pump 42 described with reference to Figure 3.

In this case the nozzle 47 will be directed forwardly of the vehicle instead of rearwardly as shown, and a flap could be provided which would open at the side of the vehicle to uncover the nozzle and to direct air into it.

In that case the flap could be arranged to be automatically opened, for example, on failure of the current in the electric circuit of the motor of the gyroscope, and this flap could open in a similar way to that in which the valve 48 is opened, or the flap could entirely replace the valve 48.

In the arrangement diagrammatically illustrated at Figure 4, the electric motor of the gyroscopic apparatus would ordinarily drive the rotor of the gyroscope and the suction would be cut off by means of a valve 48 of any suitable kind. Further means would be provided to open this valve as soon as the electric current failed in the electric circuit of the apparatus and any suitable arrangement could be employed for this purpose, but one arrangement is diagrammatically illustrated in which the valve is normally kept closed by the pull of an electric solenoid 49 included in the electric circuit of the electric motor, but which, as soon as the electric current fails, is opened by means of the spring 50 pulling in the opposite direction to the solenoid 49.

Although certain means have been illustrated diagrammatically to indicate how the two forms of drive for the gyroscope can be automatically brought into operation, it should be understood that various other forms of control are possible, such as pneumatic and electric relays and the illustrations given above should not be regarded as limiting the invention to those particular forms shown.

I claim:

1. In a gyroscopic apparatus, a casing, a frame rotatably mounted in said casing having a horizontal axis of rotation, a gyroscope spindle rotatably mounted in said frame about an axis perpendicular to the axis of rotation of the frame, a bell-shaped rotor element for the gyroscope fixed coaxially to one side of said spindle, an electric motor armature fixed on the other side of said spindle and extending within the peripheral portion of the bell-shaped rotor element, an electric motor stator mounted on the side of the frame, adjacent the armature, and extending within the peripheral portion of the bell-shaped rotor element to a position around and spaced from the motor armature, means for supplying electrical energy to the electric motor constituted by the said armature and stator, a series of spaced vanes disposed about the exterior peripheral surface of the bell-shaped rotor element of the gyroscope, a nozzle situated in said casing in a position to direct a stream of air on the vanes, and means for providing an air stream through said nozzle.

2. Gyroscopic apparatus comprising, in combination, a casing, a frame rotatably mounted in said casing having a horizontal axis of rotation, a gyroscope spindle rotatably mounted in said frame about an axis perpedicular to the axis of rotation of the frame, a bell-shaped rotor element for the gyroscope fixed coaxially to one side of said spindle, an electrical motor armature fixed on the other side of said spindle and extending within the peripheral portion of the bell-shaped rotor element, an electric motor stator mounted on the side of the frame, adjacent the armature, and extending within the peripheral portion of the bell-shaped rotor element to a position around and spaced from the motor armature, means for supplying electrical energy to the electric motor constituted by the said armature and stator, a series of spaced vanes disposed about the exterior peripheral surface of the bell-shaped rotor element of the gyroscope, a nozzle situated in said casing in a position to direct a stream of air on the vanes, means for providing an air stream through said nozzle, and means for effecting alternative operation of the rotor element of the gyroscope by the air stream providing means and electric motor.

3. Gyroscopic apparatus, as claimed in claim 2, in which the means for effecting alternative operation of the rotor element includes valve means for controlling the flow of air through the nozzle, means for maintaining said valve means closed during operation of the rotor by the electric motor, and means responsive to the failure of the supply of electrical energy to said motor for disabling said valve maintaining means to permit the flow of air through the nazzle to effect pneumatic operation of the rotor.

4. Gyroscopic apparatus, as claimed in claim 2, in which the means for effecting alternative operation of the rotor element includes an electric switch in circuit with the electric motor, an air pressure sensitive device controlling said switch and responsive to the pressure of air being supplied to said nozzle so that said switch is closed to bring the electric motor into operation to drive the rotor when the air pressure is less than that required to perform this function.

BRUNO WEINKAUFF.